United States Patent
Addison et al.

(10) Patent No.: US 6,175,864 B1
(45) Date of Patent: Jan. 16, 2001

(54) METHOD AND APPARATUS FOR STORYBOARD SCRIPTING OF APPLICATION PROGRAMS RUNNING ON A COMPUTER SYSTEM

(75) Inventors: Skip Addison, San Jose; Ricardo Jenez, Mountain View; Young Barry Kim, San Francisco; Madhusudan Krishnapuram, Mountain View; David Heintz, Santa Cruz; Doug Donohoe; Sam Neth, both of Menlo Park; Brian Zak, Redwood City, all of CA (US)

(73) Assignee: Netscape Communications Corporation, Mountain View, CA (US)

( * ) Notice: Under 35 U.S.C. 154(b), the term of this patent shall be extended for 0 days.

(21) Appl. No.: 08/885,025

(22) Filed: Jun. 30, 1997

(51) Int. Cl.[7] ............................. G06F 15/16; G06F 15/167
(52) U.S. Cl. .......................... 709/219; 709/217; 709/218; 709/250; 707/103; 707/500; 345/326
(58) Field of Search .................................... 709/203, 217, 709/218, 219, 250, 311, 328; 707/103, 500 T, 511, 12, 513; 345/326, 329, 357, 327, 302

(56) References Cited

U.S. PATENT DOCUMENTS 5,586,235 * 12/1996 Kauffman ............................. 707/500
5,852,435 * 12/1998 Vigneaux et al. .................... 345/302
5,966,121 * 10/1999 Hubbell et al. ...................... 345/328
5,966,532 * 10/1999 McDonald et al. ...................... 717/1

OTHER PUBLICATIONS

Experiences using Cooperative Interactive Storyboard Prototyping, Madsen, K.H.,Aiken, P.H., ACM Digital Library 0002–0782/93/0600–057, Mar. 1993.*

Anecdote: A Multimedia Storyboard System with Seamless Authoring Support, Harada, K., Tanaka, E., Ogawa, R., Hara, Y. C & C Research Labs, NEC USA, Inc. ACM Digital Library, 0–89791–871–Jan. 11, 1996, Mar. 1993.*

* cited by examiner

Primary Examiner—Zarni Maung
Assistant Examiner—Beatriz Prieto
(74) Attorney, Agent, or Firm—Dergosits & Noah LLP

(57) ABSTRACT

The present invention is a method and apparatus for storyboard scripting of instructions within a software application program. More specifically, the present invention provides for an organized storyboard of logic flows for navigating a visitor through a World Wide Web site. By organizing the commands in discrete parallel logic flows, future editing of the system can be easily performed.

12 Claims, 8 Drawing Sheets

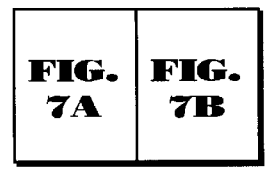

FIG.7

APPLICATION ARCHITECTURE ADMIN
ACTRA

Current application: oes
Current configuration directory: /u/saddison/modules/oeadmin

| Change Configuration Directory | Transition Table | Category/Code Tables |

Transition Table
Add ← 152  158  160  162  ✓ 150

| Delete | Edit | Form | Action | Process |
|---|---|---|---|---|
|  151 | Edit | TreeView 153 | DeleteMemObject | reply.formdata = new NTV (); obj = request.formdata.key; result = removeObject (obj); |
|  |  |  | 172 | 174 |
| ☐ | Edit | ACAdmin | DeleteMemObject | parms = new NTV (); parms.mode = "ADMIN"; <br><br> var membership = new ACMembership (parms); <br><br> sellerCompanies = Membership.SellerCompanies; <br><br> var1; <br> for(1 = 0; i < sellerCompanies.site;) ++i) ( <br>     var sellerCo = sellerCompanies[=]; |

FIG.7A

| Result Code | Next Screen ID | Generate |
|---|---|---|
| SUCCESS | TreeView | reply.template = templates[nextScreenID]; |
| FAILURE | DeleteError | reply.template = templates[nextScreenID];<br>reply.status = FAILURE; |
| SUCCESS | TreeView | reply.template = templates[nextScreenID];<br>reply.formdata = new NTV();<br>reply.formdata.rootNode = new NTV();<br>reply.formdata.rootNode.object = "rootNode";<br>reply.formdata.rootNode.treeNo = new NTV();<br>reply.formdata.rootNode.treeNo = "true"; |

FIG. 7B

METHOD AND APPARATUS FOR STORYBOARD SCRIPTING OF APPLICATION PROGRAMS RUNNING ON A COMPUTER SYSTEM

FIELD OF THE INVENTION

The present invention relates generally to the field of computer systems. More specifically, the present invention relates to a method and apparatus for organizing commands within an application software program running on a computer system.

BACKGROUND OF THE INVENTION

Computer programming languages have historically provided great flexibility in implementing desired computer fuctions at the expense of ease of use. For example, in the past, programmers were required to possess intimate knowledge of specific and advanced computer language command syntax and language architecture. This was necessary to provide the required interface between the operator inputs and graphic objects displayed on an output device such as a graphic display or video monitor.

With the increased interest and proliferation of the internet and the World Wide Web, a greater number of programming techniques and languages have evolved for specific implementation on the internet. These programming languages, such as Java™ and Perl™, allow novice programmers to easily create Websites and other application programs for execution on the World Wide Web. These languages have gained increased popularity as companies realize the benefits of the World Wide Web. More and more companies are creating and maintaining their own Websites for promoting and assisting their businesses. Many larger companies are also creating intranets, or internal internets for disseminating private information throughout the company.

Typically, a Website contains a home page which is the first screen accessed by a visitor to the Website. The home page provides the starting point for a visitor to the Website and usually provides access to subsequent pages in the Website (ordered according to the visitor's responses to particular queries) or to other Websites altogether. Websites may also include executable functions which the visitor can operate. For example, the Website may incorporate key word search engines and automated purchase order forms.

FIG. 1 illustrates a simplified block diagram of a typical Web-based application flow. Block 1 illustrates a first page of a Website or application program displayed to a visitor or user. The displayed page can be a company's home page or can be any page within the company's Website. Usually pages have a means for entering a command into the system. This typically includes using a mouse to "click" on a hot-zone (i. e. a button) or pressing a key, but specialized applications may incorporate touch-screen technology or voice commands.

When a hot zone is activated, a command is transmitted to the Web server 2. The Web server 2 then calls a hard-coded application program 3 which processes the command, retrieves data from a database 4 if necessary, and outputs a response usually in the form of a next displayed page 5.

Currently, this "application flow" usually exists in hard coded application logic which is unique or customized to a particular application. When someone wants to change the application flow, there are two conventional methods for changing Web-based client-server applications. Both methods have substantial drawbacks. The first method involves having a central program that is responsible for all sub-tasks, including performing all the actions desired by the user, determining the next HyperText Markup Language ("HTML") document to display, and retrieving the HTML document from disk or generating it from available data. The principle weakness of this approach is that the central program logic for performing each of these subtasks is mixed with the logic for other sub-tasks. In a complex system, it is difficult to change the program logic for one sub-task without causing a disruption in the performance of the other subtasks. For example, the logic for generating the next HTML document from existing data may have a dependency on the instructions executed in performing the sub-task determined by the previous form. Such dependencies are not inherent, but typical nonetheless because the organization of logic provides no natural separation between the sub-tasks.

The second method of changing the application program involves Web pages which are generated with the use of HTML documents. HTML-based applications link the different pages using hypertext links. These links can be visualized as a spider web with each node in the web representing a different Web page. Small applications using a limited number of pages can be managed with little difficulty because navigation through each link in the web can be easily visualized. As the number of pages and corresponding links increases, and it becomes more difficult or impossible to visualize the entire web of documents, amending or deleting links in the web cannot easily be accomplished without negatively impacting other links and pages. This is further complicated by the fact that a particular page may often not be directly linked to another page but will be linked through other multiple pages. Thus, the deletion of a particular link without knowing all of the corresponding links can adversely impact the overall program.

In view of these problems with editing or changing application programs, a system is needed which organizes the application program based commands so that subsequent editing of the commands is straight forward. It is desirable to provide a system which allows system administrators with little programming knowledge or experience to quickly and easily implement the changes. It is further desirable to separate the logic of performing the requested actions from the logic of generating the code the next action (i.e. screen to be displayed).

SUMMARY OF THE INVENTION

In an application program based computer system having a processor, a storage device, a display and an input device, programmed to execute a series of application program commands in response to system user interaction with the computer system, the present invention provides for a method for scripting amendable application program commands in a storyboard transition table format comprising the steps of a) generating a plurality of logic scripts wherein each one of the plurality of logic scripts comprises: executable application program commands for identifying a current state in which the computer system must reside in order to access a corresponding one of the plurality of logic scripts; ii) executable application program commands for recognizing a transition state in the computer system; iii) a predetermined set of executable application program commands for responding to the recognized transition state; and iv) executable application program commands for determining a next state; b) generating a storyboard transition table having parallel rows of cells stored in the computer system; and c) organizing and storing the plurality of logic scripts in the storyboard table. It is contemplated that the plurality of logic scripts further comprises executable application program commands for generating the next state. It is further contemplated that the predetermined set of commands comprises commands programmed in a computer language selected from the group of computer languages consisting of Java Script™, C++ and Perl™.

In an application program based computer system having a processor, a memory device, a video display and an input device, programmed to execute a series of application program commands in response to a visitor's interaction with the computer system, the present invention also provides for a computer-readable memory comprising a storyboard transition table having parallel rows of cells for controlling a visitor's interaction with the computer system, wherein each one of the plurality of parallel rows of cells comprises a) executable application program commands for identifying a current state in which the computer system must reside in order to access a corresponding one of the plurality of logic scripts; b) executable application program commands for recognizing a transition state in the computer system; c) a predetermined set of executable application program commands for responding to the recognized transition state; and d) executable application program commands for determining a next state. It is contemplated that each one of the plurality of parallel rows of cells further comprises executable application program commands for generating the next state. It is further contemplated that the predetermined set of commands comprises commands programmed in a computer language selected from the group of computer languages consisting of Java Script™, C++ and Perl™.

In an application program based computer system having a processor, a memory device, a video display and an input device, programmed to execute a series of application program commands in response to a visitor's interaction with the application program based computer system, the present invention further provides for a method for editing commands programmed within a storyboard transition table comprising the steps of a) providing a computer-readable memory comprising a storyboard transition table having parallel rows of cells for controlling a visitor's interaction with the computer system, wherein each one of the plurality of parallel rows of cells comprises i) executable application program commands for identifying a current state in which the computer system must reside in order to access a corresponding one of the plurality of logic scripts; ii) executable application program commands for recognizing a transition state in the computer system; iii) a predetermined set of executable application program commands for responding to the recognized transition state; iv) executable application program commands for determining a next state; and b) editing at least one of the series of commands in the storyboard transition table. It is further contemplated that each one of the plurality of parallel rows of cells also comprises executable program commands for generating the next state.

For each method, apparatus and article of manufacture, the present invention also contemplates that they be designed for use with World Wide Web-based computer systems and networks.

The present invention also contemplates a web-based client-server computer system for executing a predetermined series of commands in response to user interaction with the computer system comprising: a) a web-based computer server in communication with visitors through a communications network; and b) a web server plug-in coupled for operating with the web-based computer server, wherein the web server plug-in comprises i) a storyboard transition table including 1) executable application program commands for identifying a currently displayed web page which must be presently displayed in order to access a corresponding one of the plurality of logic scripts; 2) executable application program commands for recognizing a transition state in the computer system; 3) a predetermined set of executable application program commands for responding to the recognized transition state; 4) executable application program commands for determining a next web page for display after execution of the predetermined set of commands; and 5) executable application program commands for displaying the next web page; ii) an execution engine for executing the storyboard transition table's executable application program commands; and iii) an action dispatcher coupled to the storyboard transition table for receiving data from the visitor through the communication network, locating appropriate executable application program commands from the storyboard transition table and passing the appropriate executable application program commands to the execution engine for processing.

It is still further contemplated that the present invention not be limited to embodiments that incorporate a table format but also that the organization of executable application program commands be organized in a hierarchical tree format.

BRIEF DESCRIPTION OF THE DRAWINGS

FIG. 7 illustrates an example screen shot of an actual transition table including software instructions.

DETAILED DESCRIPTION OF THE PREFERRED EMBODIMENT

In the late 1980s, electronic commerce, specifically Electronic Data Interchange ("EDI"), emerged as a powerful tool to help corporations reduce the processing costs associated with purchasing. From that start, internet commerce (especially through the World Wide Web) has emerged as a new and powerful tool. Commerce on the internet has the potential to deliver huge productivity gains to its adopters because it is already global, ubiquitous and affordable. It is also rapidly becoming a secure, reliable and powerful enabler. Applications harnessing this mechanism can provide corporations with instantaneous access to the most powerful tool of all, information.

In order to assist with commerce and advertising on the internet, numerous client-server based application programs have developed. However, the commands for generating the Web-based application programs (i e. Websites) have not been organized to facilitate future edits. The present invention addresses this problem by organizing and storing logic scripts, or groups of commands, in a storyboard format wherein the storyboard comprises a table with parallel rows of cells. By organizing the logic scripts in parallel rows, navigation through the different commands and Web pages is more easily visualized and managed.

While the present invention will be described in detail by way of illustration and example using the World Wide Web as an exemplary platform, it will be understood by those skilled in the art that certain changes and modifications may be made to the described embodiments without departing from the spirit of the invention and scope of the appended claims. For example, it is contemplated that the present invention can be applied to software application programs designed for applications other than electronic commerce. Furthermore, while the present invention is described with respect to Web-based application programs utilizing remote clients and servers, it is also contemplated that the present invention be incorporated into stand alone applications (e.g. educational software) running on a processor and display but with network or other communication connection.

Figure 1:
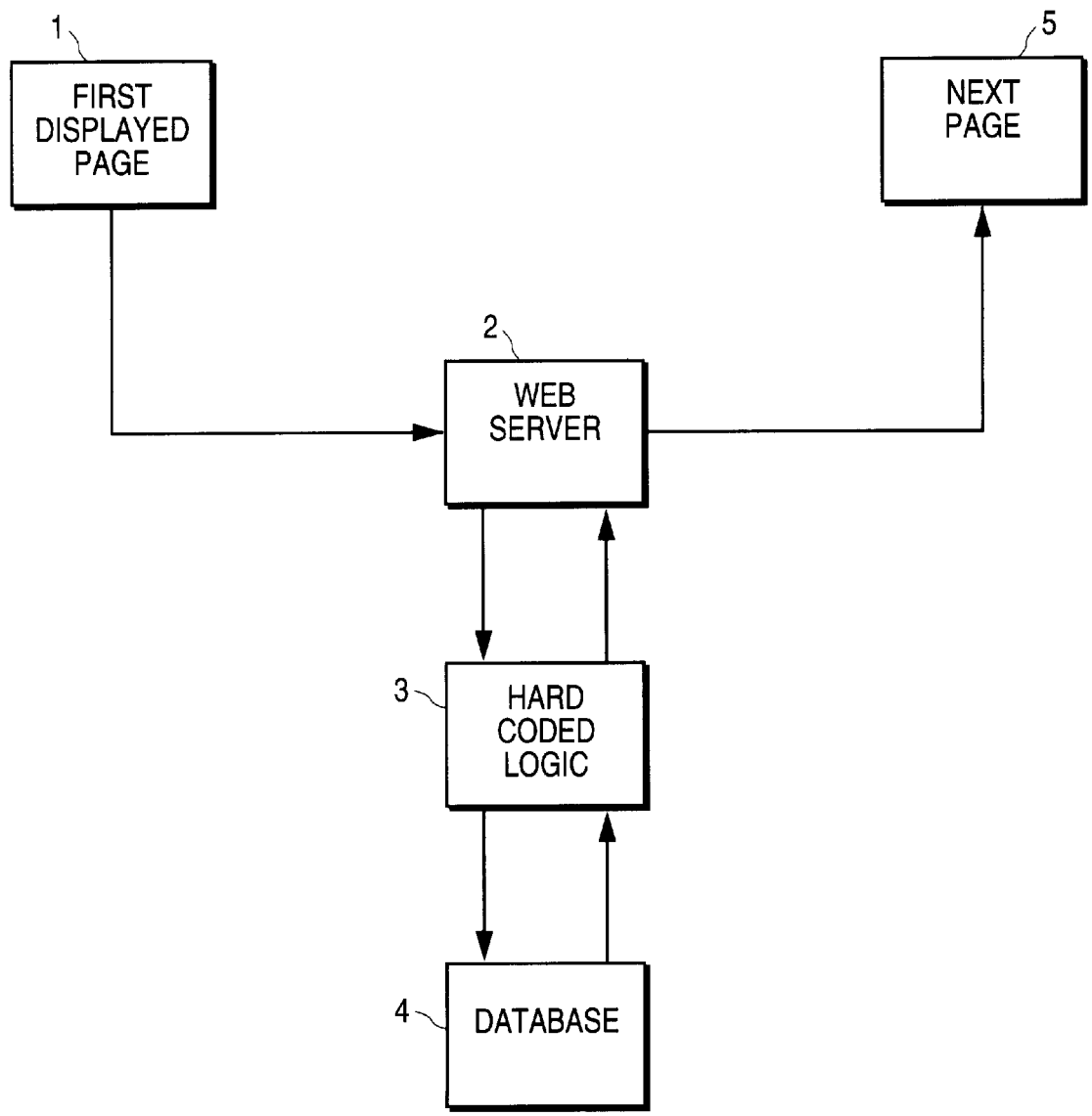
FIG. 1 illustrates a simplified block diagram of a typical Web-based application flow.
Figure 2:
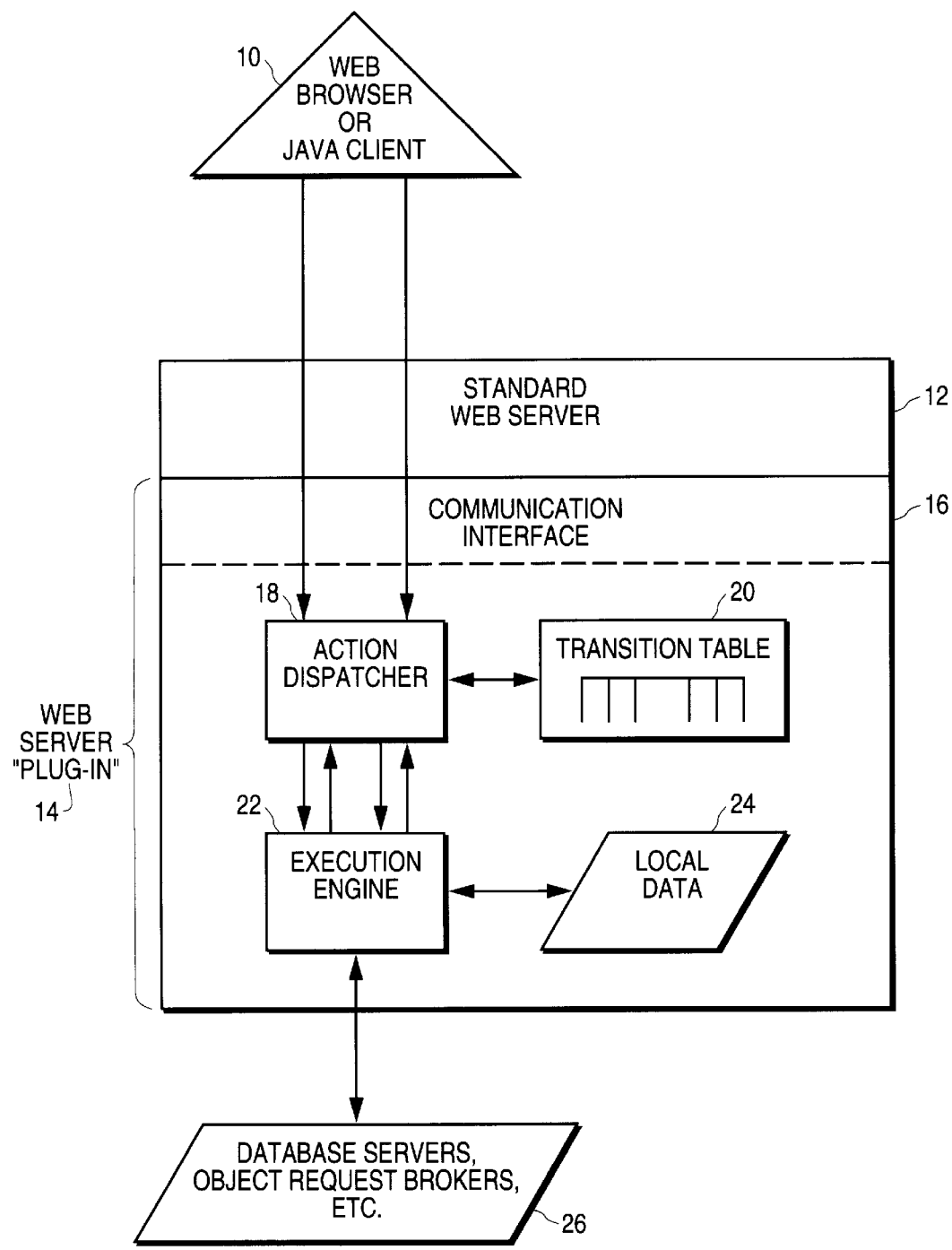
FIG. 2 illustrates an overview of the flow of data from a visitor to a server which incorporates the present invention.

In the specification, a distinction is made between a visitor and a customer. As used herein, a visitor is a person who is visiting a web site for its intended purpose. The term customer is used herein to refer to the system administrator charged with scripting or editing the application program. FIG. 2 illustrates an overview of the flow of data from a visitor to a Web server which incorporates the present invention. Specifically, a visitor using a Web browser such as Netscape Navigator™ or a Java™ client can access a standard Web server coupled to a Web server "plug-in"14 which includes the present invention. The standard Web server 12 can be selected from, but is not limited to, a Sun SPARC/Ultra Server; Solaris 2.5 (Sun Microsystems, Mountain View, Calif.), a Windows™ NT 3.51/4.0 server (Microsoft, Seattle, Wa.), a Hewlett-Packard HP/UX 9.x/10 server (Cupertino, Calif.) and an IBM RS/6000; AIX 3.2/4.xserver (Armock, N.Y.).

The Web server plug-in 14 is a software module configured to operate with the Web server. In the preferred embodiment of this invention, web server plug in 14 is written in C++ programming language and is designed to plug into the Netscape Enterprise™ server 2.1 and 3.0. The Web server plug-in 14 includes a communication interface 16 that facilitates data transfer between the Web server plug-in 14 and a Web browser or Java™ client.

The Web server plug-in 14 includes additional software modules. An action dispatcher 18 receives information and requests from the Web browser 10 through the standard Web server 12 and communications interface 16. The action dispatcher 18 identifies the appropriate transition table 20 and associated entries in response to the particular commands and data supplied by the Web browser 10. An execution engine 22 coupled to the action dispatcher 18 then executes particular commands from the transition table 20 that are responsive to the data and commands transmitted by the Web browser 10. Local data 24 represents frequently used data (i.e. cached data) such as session information and user ID. Local data 24 is also coupled to the execution engine 22.

Additional peripheral devices 26 such as database servers and object request brokers can be coupled to the execution engine 22 for providing additional support. The object request brokers can be for example, Common Object Request Broker Architect ("CORBA"), which can establish the appropriate connections to different servers for obtaining desired services (i.e. order or membership catalogues). For example, one server can be used to maintain and generate a catalogue database while another maintains a customer list.

Figure 3:
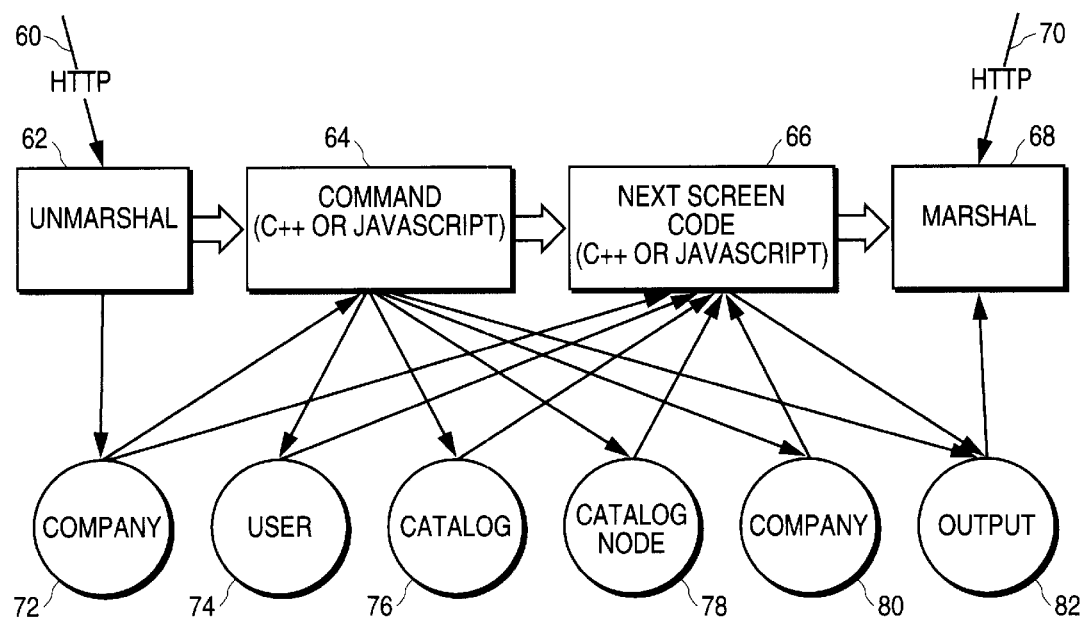
FIG. 3 illustrates a block diagram illustrating the action dispatcher of the present invention.

Action dispatcher 18 resides in the Web server plug-in 14 (see FIG. 2) and acts as a look-up engine 16 for reading the transition table 20. Commands organized and stored in the transition table 20 are passed to the execution engine 22 for processing. The result is then passed by the action dispatcher 18 back to the transition table 20 for determining the appropriate next screen. The executable application program commands for generating the next screen are then passed back to the execution engine 22 for processing. FIG. 3 illustrates a functional overview of the action dispatcher of the present invention. Hypertext Transfer Protocol ("HTTP") instructions 60 are received by the action dispatcher 18. HTTP is an application level protocol designed for web users with a simple request/response model that establishes the appropriate connections with a Web server specified in the Uniform Resource Locator ("URL"), retrieves the needed document and then closes the connection.

Data from a visitor is first marshalled before transmission to the action dispatcher 18. Marshalling places the data in a standard format (i.e. protocol) that can be transmitted across a communications channel and reconstructed at the receiving end. After the marshalled HTTP instructions 60 are received by the action dispatcher 18, they are unmarshalled at block 62. Action dispatcher 18 next determines the appropriate executable application program commands to execute at block 64 and following that, the appropriate executable application program commands for generating the next screen at block 66. The resulting data for generating the next screen is then marshalled at block 68 before being transmitted back to the visitor as HTTP instructions 70. FIG. 3 illustrates that each of the operational blocks 62, 64, 66 and 68 reference different data objects. For example, input object 72 represents the visitor's HTTP instructions 60; user object 74 represents user ID information and other session data; catalog, cat. node object 78 and company object 80 represents catalogue and company information; and output object 82 represents data which results from executing particular commands in the transition table 20.

Figure 4:
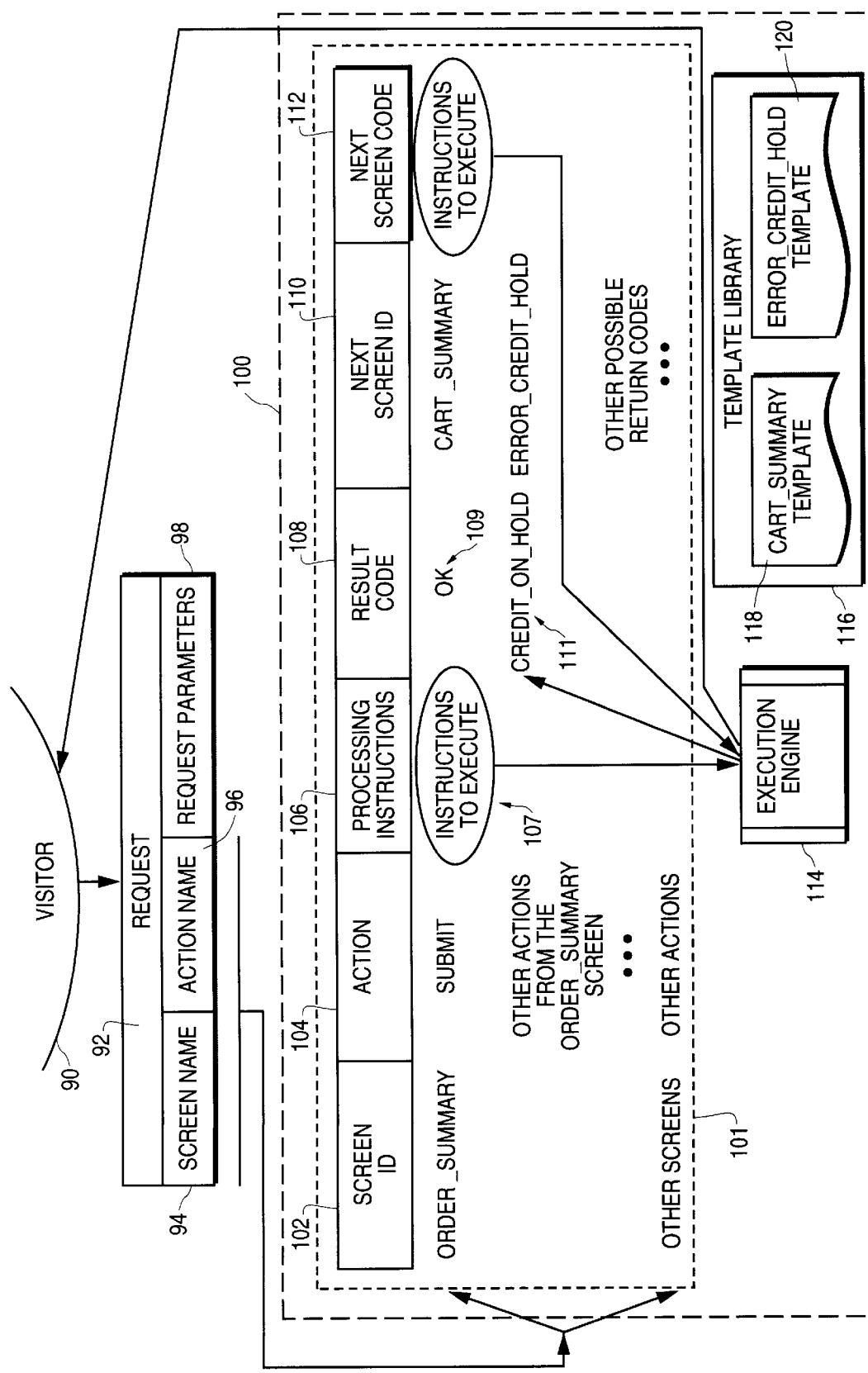
FIG. 4 illustrates the data and instruction flow from a visitor through the present invention.

Data and instruction flow from a visitor through a Web server running the present invention is shown in FIG. 4. Typically, a visitor 90 utilizing a Web browser such as Netscape Navigator™ first issues a request 92 which specifies the name of a screen 94 currently being displayed to the visitor 90, a request 96 for a particular action (e.g. display a new screen, purchase a particular item) and request parameters 98 (e.g. how many items to purchase and where to send the items). Request 92 is then received by a Web server 100 which includes the action dispatcher 18 (not shown but described with reference to FIG. 2 above), the transition table 101, execution engine 114 and template library 116. The action dispatcher 18 uses the request 92 to select the proper logic script and executable application program commands therein to execute from the transition table 101. The executable application program commands responsive to the visitor's request are delivered to the execution engine 114 for processing. In the preferred embodiment, Javascript™ (Sun Microsystems, Mountain View, Calif.) is used for programming the processing languages and a Javascript™ interpreter is the execution engine, but other languages and interpreters can also be utilized, and are considered to be within the scope of the claims appended hereto. For example, the present invention supports the use of compiled languages such as C++ for the processing instructions.

The template library 116 includes boilerplate screens for display. In essence, they are skeleton pages which are combined with particular session data for display to a visitor.

The transition table 101 includes rows and columns which form cells. Each row of cells represents a parallel logic flow which identifies particular actions or executable application program commands for processing. Each cell in column 102 identifies a particular screen that must be currently displayed to the visitor in order to execute the instructions described in the corresponding row. Alternatively, the presently displayed screen can be thought of as the present state of the computer system. Each cell in column 104 identifies a particular action (present in the request 92) that is being requested by the visitor. Each cell in column 106 includes executable application program commands for execution in response to the request 92. Each cell in column 108 illustrates the possible results from executing the executable application program commands described in column 106. The results can be any command string chosen by the application designer. For example, Column 8 of FIG. 4 illustrates two cells 109 and 111 that provide two possible results from executing the executable application program command 107, "OK" and "CREDIT_ON_HOLD." The result is compared against the options identified in the transition table to determine the next screen name identified in cells aligned within column 110. This next screen is displayed to the visitor using the executable application program commands identified in cells aligned within column 112.

Figure 5:
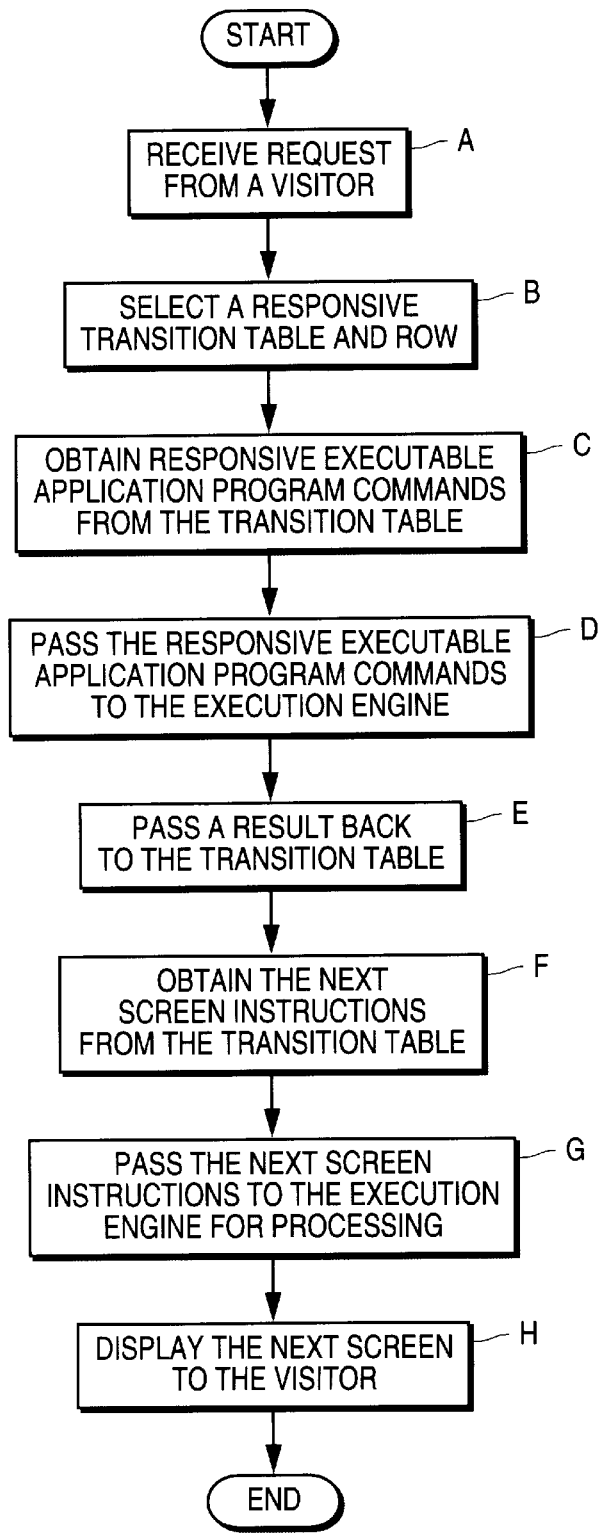
FIG. 5 illustrates an example flowchart describing interrelated operation of the action dispatcher, the transition table and the execution engine.

An example flowchart describing interrelated operation of the action dispatcher, the transition table and the execution engine is shown in FIG. 5. Starting at block A, the action dispatcher receives a request from a visitor. As discussed above with reference to FIG. 4, the visitor request includes a current screen name, an action (i. e. display a catalogue screen) and request parameters (i.e. the 1997 catalogue). At block B, the responsive transition table and responsive row of that transition table (which identifies a logic script) is determined based upon the visitor's request. At block C, the executable application program commands responsive to the visitor's request are determined. At block D, the responsive executable application program commands are passed to the execution engine for processing. At block E, the result is passed back to the transition table. At block F, the executable application program commands for generating the next screen are determined from the result of block E. At block G, the executable application program commands for generating the next screen are passed back to the execution engine for processing. At block H, the next screen is then displayed to the visitor. This procedure is then repeated upon receipt of a new request from the visitor.

Figure 6:
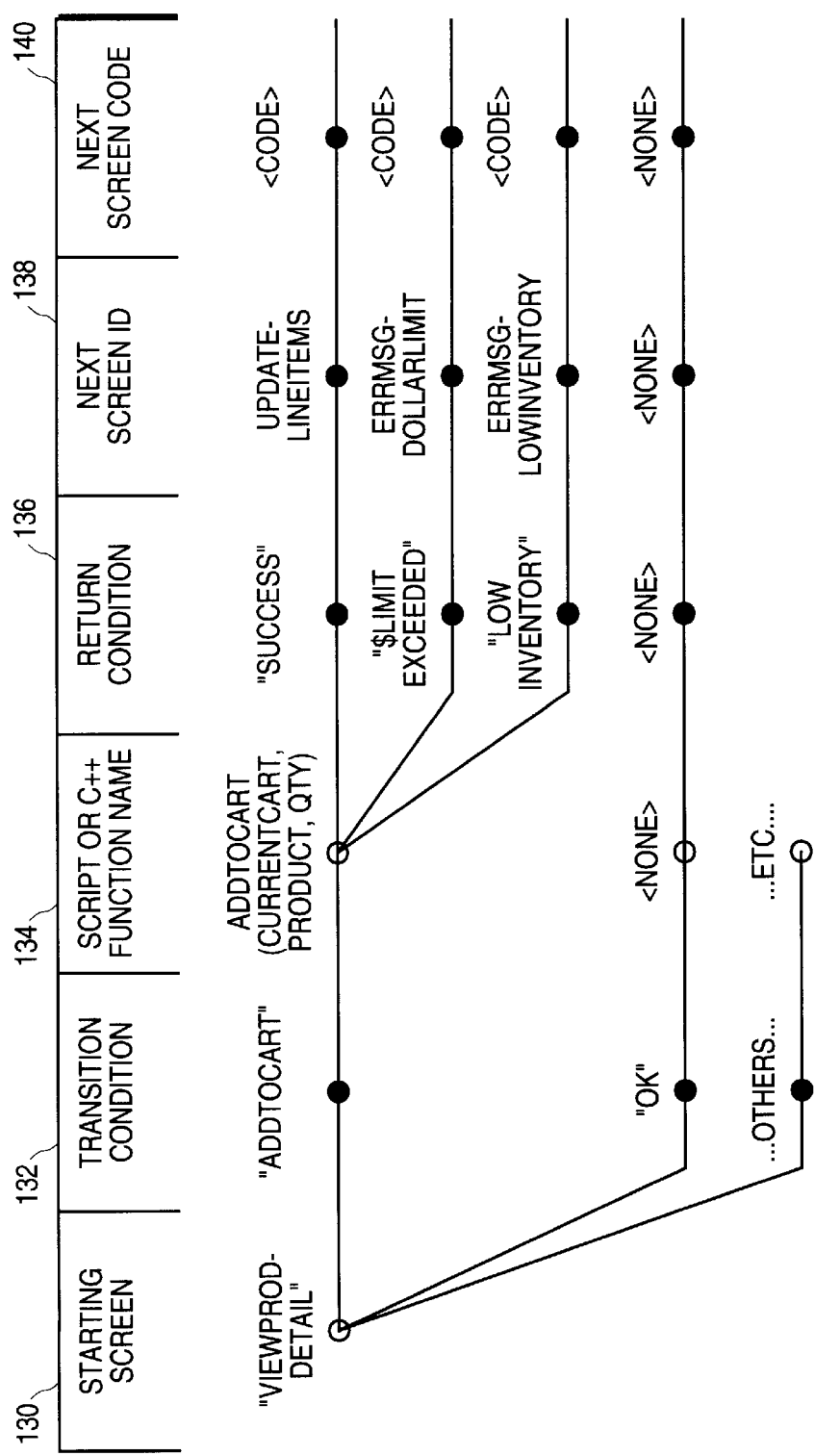
FIG. 6 illustrates an example transition table.

A more detailed flow diagram of an example transition table is shown in FIG. 6. The transition table's individual rows include cells wherein each row of cells represent short flow charts (i.e. logic flows). Although the invention is explained here with reference to a table format, it is by no means limited to such a representation. For example, the storyboard can also be represented as horizontal or vertical cells linked by arrows or as a branching tree.

The left most column 130 includes vertically aligned cells which identify the starting or presently displayed screen to a visitor. For example, this can be the initial home page that is displayed when a visitor first accesses a company's Website. In this example, the starting screen includes the details of a company's product list ("ViewProdDetail").

Column 132 includes vertically aligned cells which identify transition conditions for prompting the system to execute a particular action. In this example, the transition condition is the visitor clicking on an "add to cart" button in order to add a particular product to the visitor's shopping cart. Shopping carts are a fictional construct for retaining particular products identified by the visitor during the browsing phase. By placing items in his/her shopping cart, the visitor can easily keep track of and refer back to those products at a later time during his/her visit or during future visits to the Website (i.e. for purchase).

Column 134 includes vertically aligned cells which identify executable application program commands which are processed in response to a particular starting screen and transition condition combination. In other words, when the system recognizes a particular transition condition, such as clicking on a particular hot zone, while viewing a particular screen, predetermined executable application program commands are processed. These executable application program commands can be programmed in any language such as C++, Java Script™ or Perl™. For convenience, the transition table may only contain a pointer or link to the appropriate executable application program commands. In this example, the executable application program commands identifies the selected product and the visitor's shopping cart and determines the current inventory of available products.

Column 136 includes vertically aligned cells which identify a return condition in response to execution of the executable application program commands from column 134. In this example, the return condition can be 1) that the action has been performed successfully and the selected product has been placed in the visitor's shopping cart, 2) that the visitor has exceeded the amount of credit he has with the company, or 3) that the inventory is low on that product and consequently, none may be available.

Column 138 includes vertically aligned cells which identify the name of the next screen to be displayed to the visitor in response to the return condition. For example, if the return condition is "Success," then the next screen will notify the visitor that the product was added to his shopping basket. If the return condition is that he exceeded his credit or that the inventory is low, then an error message will be displayed informing the visitor of the situation.

Column 140 includes vertically aligned cells which identify executable application program commands for displaying the next screen.

Since the table format is a question of preference and is related to the specific application, it is important to remember that the basic concept of the present invention is to provide an organized transition table for storing commands, conditions and corresponding logic in such a manner that they can be easily accessed and amended, during programming or after release to a customer. The exact number of levels within the transition table can vary to suit the application.

An exemplary screen shot of an actual transition table 150 including software instructions for use in navigating a visitor through different pages making up a Web site is shown in FIG. 7. The transition table 150 comprises parallel rows of cells with each cell identifying a particular command or condition. By editing particular entries in the cells, programmers can alter the navigation of a visitor through the different pages.

To edit table 150, three hypertext links are provided. Links 152 and 154 allow programmers to add and delete entries, respectively. Link 153 allows a programmer to edit entries by calling a form field within which the actual changes are made. These changes will then be reflected in the appropriate cell of transition table 150. The remaining columns 158, 160, 162, 164, 166 and 168 are similar to the columns described in FIG. 6. Column 158 includes cells which indicate executable application program commands for identifying the possible starting screen or page displayed to the visitor. Cell 170 describes the starting screen for the first row as the "TreeView screen." Column 160 includes cells which identify executable application program commands for determining a transition condition that must be present while the corresponding screen from column 158 is displayed. Cells or commands correspond to one another if they belong to the same row.

Cell 172 describes the transition condition "DeleteMemObject" for the first row. Column 162 includes cells which identify executable application program commands processed in response to the present screen and transition conditions from columns 158 and 160. For example, Cell 174 describes executable application program commands that will be passed by the action dispatcher (see FIG. 4) to the execution engine (see FIG. 4) and processed when the "TreeView" screen is being displayed and the "DeleteMemObject" command is selected.

Column 164 includes cells which identify a result from processing of the executable application program commands in column 162. Cells 176 and 177 provide for two possible results from processing the execution of the executable application program commands in cell 174, either "success" or "failure." Column 166 includes cells which describe the possible name of the next screen to be displayed to the visitor depending on the result in column 164. If the result is "success," then the next screen code will be "TreeView." If however, the result is "failure," then the next screen name will be "DeleteError." The cells within the final column 168 provides the executable application program commands for generating the next screen. For example, Cell 180 provides the specific executable application program commands for generating the "TreeView" screen. These executable application program commands are passed to the execution engine (see FIG. 4) for processing.

While the present invention has been described with reference to a single transition table, it is also contemplated that numerous different transition tables can be utilized depending on the particular visitor. For example, the president of a company may have access to a transition table with unlimited access to every screen and file in the system. In contrast, an entry level clerk may have access to a transition table with only limited access to particular screens needed for their job. This provides for increased security because once a particular transition table is assigned to a visitor, there is no way to access restricted screens. This format is different than conventional applications wherein visitors with different privileges have the same user interface but with varying levels of privileges, that is, the visitor interface usually enforces visitor privileges but does not otherwise behave differently for different security levels. In the present invention, however, different visitors have an entirely different interaction with the application.

The present invention also provides a simple and organized format which greatly reduces the learning curve for system administrators. Consequently, system administrators can play a more active roll in customizing and debugging the application programs for their particular business. To further assist system administrators, it is also contemplated that a graphical interface be provided for the transition table with graphical tools to for easier modifications.

Although related, the present invention can be utilized in two ways. First, application programs can be predesigned using the present invention's format and sold to customers. The customers can then become their own editor and modify the program to suit their individual needs. Second, a blank transition table can be supplied to customers with lists of preconfigured commands and conditions for allowing the customers to program their own applications. It may be the best scenario, however, wherein the two are integrated to form a working relationship between the programmer and customers until the customers become familiar with the format and have a customized application program nearly finished.

We claim:

1. In an application program based computer system having a processor, a storage device, a display and an input device, programmed to execute a series of application program commands in response to system user interaction with the computer system, a method for scripting amendable application program commands in a storyboard transition table format comprising the steps of:

a) generating a plurality of logic scripts wherein each one of the plurality of logic scripts comprises:
        i) executable application program commands for identifying a current state in which the computer system must reside in order to access a corresponding one of the plurality of logic scripts;
        ii) executable application program commands for recognizing a transition state in the computer system;
        iii) a predetermined set of executable application program commands for responding to the recognized transition state; and
        iv) executable application program commands for determining a next state;
    b) generating a storyboard transition table having parallel rows of cells stored in the computer system; and
    c) organizing and storing the plurality of logic scripts in the storyboard table.

2. The method of claim 1 wherein each one of the plurality of logic scripts further comprises executable application program commands for generating the next state.

3. The method of claim 1 wherein the predetermined set of commands comprises commands programmed in a computer language selected from the group of computer languages consisting of Java Script™, C++ and Perl™.

4. In an application program based computer system having a processor, a memory device, a video display and an input device, programmed to execute a series of application program commands in response to a visitor's interaction with the computer system, a computer-readable memory comprising a storyboard transition table having parallel rows of cells for controlling a visitor's interaction with the computer system, wherein each one of the plurality of parallel rows of cells comprises:

a) executable application program commands for identifying a current state in which the computer system must reside in order to access a corresponding one of the plurality of logic scripts;
    b) executable application program commands for recognizing a transition state in the computer system;
    c) a predetermined set of executable application program commands for responding to the recognized transition state; and
    d) executable application program commands for determining a next state.

5. The method of claim 4 wherein each one of the plurality of parallel rows of cells further comprises executable application program commands for generating the next state.

6. The method of claim 4 wherein the predetermined set of commands comprises commands programmed in a computer language selected from the group of computer languages consisting of Java Script™, C++ and Perl™.

7. In an application program based computer system having a processor, a memory device, a video display and an input device, programmed to execute a series of application program commands in response to a visitor's interaction with the application program based computer system, a method for editing commands programmed within a storyboard transition table comprising the steps of:
  a) providing a computer-readable memory comprising a storyboard transition table having parallel rows of cells for controlling a visitor's interaction with the computer system, wherein each one of the plurality of parallel rows of cells comprises:
    i) executable application program commands for identifying a current state in which the computer system must reside in order to access a corresponding one of the plurality of logic scripts;
    ii) executable application program commands for recognizing a transition state in the computer system;
    iii) a predetermined set of executable application program commands for responding to the recognized transition state;
    iv) executable application program commands for determining a next state; and
  b) editing at least one of the series of commands in the storyboard transition table.

8. The method of claim 7 wherein each one of the plurality of parallel rows of cells further comprises executable program commands for generating the next state.

9. In a web based computer system having a processor, a memory device, a video display and an input device, programmed to execute a series of application program commands in response to a visitor's interaction with the computer system, a computer-readable memory comprising a storyboard transition table having parallel rows of cells for controlling a visitor's interaction with the computer system, wherein each one of the plurality of parallel rows of cells comprises:
  a) executable application program commands for identifying a currently displayed web page which must be presently displayed in order to access a corresponding one of the plurality of logic scripts;
  b) executable application program commands for recognizing a transition state in the computer system;
  c) a predetermined set of executable application program commands for responding to the recognized transition state;
  d) executable application program commands for determining a next web page for display after execution of the predetermined set of commands; and
  e) executable application program commands for displaying the next web page.

10. A web-based client-server computer system for executing a predetermined series of commands in response to user interaction with the computer system comprising:
  a) a web-based computer server in communication with visitors through a communications network; and
  b) a web server plug-in coupled for operating with the web-based computer server, wherein the web server plug-in comprises:
    i) a storyboard transition table including:
      1) executable application program commands for identifying a currently displayed web page which must be presently displayed in order to access a corresponding one of the plurality of logic scripts;
      2) executable application program commands for recognizing a transition state in the computer system;
      3) a predetermined set of executable application program commands for responding to the recognized transition state;
      4) executable application program commands for determining a next web page for display after execution of the predetermined set of commands; and
      5) executable application program commands for displaying the next web page;
    ii) an execution engine for executing the storyboard transition table's executable application program commands; and
    iii) an action dispatcher coupled to the storyboard transition table for receiving data from the visitor through the communication network, locating appropriate executable application program commands from the storyboard transition table and passing the appropriate executable application program commands to the execution engine for processing.

11. In an application program based computer system having a processor, a storage device, a display and an input device, programmed to execute a series of application program commands in response to system user interaction with the computer system, a method for scripting amendable application program commands in an organized format comprising the steps of:
  a) generating a plurality of logic scripts wherein each one of the plurality of logic scripts comprises:
    i) executable application program commands for identifying a current state in which the computer system must reside in order to access a corresponding one of the plurality of logic scripts;
    ii) executable application program commands for recognizing a transition state in the computer system;
    iii) a predetermined set of executable application program commands for responding to the recognized transition state; and
    iv) executable application program commands for determining a next state;
  b) generating a storyboard transition table having parallel rows of cells stored in the computer system; and
  c) organizing and storing the plurality of logic scripts in a hierarchical tree format.

12. In an application program based computer system having a processor, a memory device, a video display and an input device, programmed to execute a series of application program commands in response to a visitor's interaction with the computer system, a computer-readable memory comprising a storyboard transition organization of a plurality of logic scripts for controlling a visitor's interaction with the computer system, wherein each one of the logic scripts comprises:
  a) executable application program commands for identifying a current state in which the computer system must reside in order to access a corresponding one of the plurality of logic scripts;
  b) executable application program commands for recognizing a transition state in the computer system;
  c) a predetermined set of executable application program commands for responding to the recognized transition state; and
  d) executable application program commands for determining a next state.

* * * * *